United States Patent [19]

Itoh

[11] Patent Number: 4,602,142

[45] Date of Patent: Jul. 22, 1986

[54] ELECTRIC DISCHARGE SYSTEM INCLUDING MEANS TO NORMALIZE THE INTERPOLE GAP TO MINIMIZE ABNORMAL DISCHARGE CONDITIONS

[75] Inventor: Tetsuroh Itoh, Aichi, Japan

[73] Assignee: Mitsubishi Denki Kabushiki Kaisha, Tokyo, Japan

[21] Appl. No.: 509,512

[22] Filed: Jun. 30, 1983

[30] Foreign Application Priority Data

| Jun. 30, 1982 | [JP] | Japan | 57-113550 |
| Jul. 28, 1982 | [JP] | Japan | 57-131629 |
| Jul. 28, 1982 | [JP] | Japan | 57-131630 |
| Aug. 2, 1982 | [JP] | Japan | 57-134921 |
| Aug. 2, 1982 | [JP] | Japan | 57-134922 |
| Aug. 2, 1982 | [JP] | Japan | 57-134923 |

[51] Int. Cl.$^4$ ............................. B23H 1/02; B23H 1/10
[52] U.S. Cl. ................. 219/69 C; 219/69 C; 219/69 M; 219/69 S; 219/69 D
[58] Field of Search ............... 219/69 C, 69 G, 69 M, 219/69 V, 69 S, 69 P, 69 D

[56] References Cited

U.S. PATENT DOCUMENTS

| 3,604,844 | 9/1971 | Olsson | 219/69 G |
| 3,624,337 | 11/1971 | Kauffman | 219/69 P |
| 3,662,143 | 5/1972 | Davis | 219/69 G |
| 3,975,607 | 8/1976 | Ullmann et al. | 219/69 D |
| 4,009,361 | 2/1977 | Stanton et al. | 219/69 C |
| 4,150,275 | 4/1979 | Wavre | 219/69 G |
| 4,267,423 | 5/1981 | Bell, Jr. et al. | 219/69 C |
| 4,296,302 | 10/1981 | Bell, Jr. et al. | 219/69 C |
| 4,338,504 | 7/1982 | Gray | 219/69 C |
| 4,339,650 | 7/1982 | Tanaka et al. | 219/69 G |
| 4,346,278 | 8/1982 | Bhattacharyya et al. | 219/69 M |
| 4,348,573 | 9/1982 | El-Menshawy et al. | 219/69 C |
| 4,361,745 | 11/1982 | Rupert et al. | 219/69 G |
| 4,367,400 | 1/1983 | Otto et al. | 219/69 C |
| 4,443,680 | 4/1984 | El-Menshawy et al. | 219/69 C |

FOREIGN PATENT DOCUMENTS

| 2505944 | 9/1975 | Fed. Rep. of Germany | 219/69 G |
| 56-114623A | 9/1981 | Japan | 219/69 C |
| 56-152526A | 11/1981 | Japan | 219/69 G |
| 56-152527A | 11/1981 | Japan | 219/69 G |
| 56-152529A | 11/1981 | Japan | 219/69 C |
| 56-152536A | 11/1981 | Japan | 219/69 M |
| 8102127 | 8/1981 | PCT Int'l Appl. | 219/69 G |

Primary Examiner—Clarence L. Albritton
Assistant Examiner—Geoffrey S. Evans
Attorney, Agent, or Firm—Sughrue, Mion, Zinn, Macpeak, and Seas

[57] ABSTRACT

A voltage sensor senses the gap voltage between an electrode and a conductive workpiece and compares it to a reference voltage using a comparator amplifier. The output from the comparator amplifier is used by an oil hydraulic servomechanism to raise and lower the electrode. An ultrasonic sensor detects impulse waves from discharges and a current sensor detects the working current for determining the working conditions of the gap. After a predetermined number of irregular discharges occurs the gap width may be widened by the servomechanism, the flow of dielectric fluid may be increased to remove sludge and debris, or the time between machining pulses may be increased.

41 Claims, 10 Drawing Figures

ELECTRIC DISCHARGE SYSTEM INCLUDING MEANS TO NORMALIZE THE INTERPOLE GAP TO MINIMIZE ABNORMAL DISCHARGE CONDITIONS

BACKGROUND OF THE INVENTION

This invention relates to an electric discharge system and, more particularly, it relates to an electric discharge device wherein an electrode and a workpiece are arranged to face each other through an insulating working liquid and an electric discharge is generated in an interpole gap to process the workpiece.

FIG. 1 is a schematic structural view of a conventional electric discharge device. In FIG. 1, an electrode 10 is positioned across a workpiece 14 placed in a processing tank 12 having an insulating working liquid 16. The output of a power supply 18 is connected across the electrode 10 and the workpiece 14. The power supply 18 comprises a DC supply 18a, a switching element 18b to establish an intermittent working current flow, a current-limiting resistor 18c, and an oscillator 18d for controlling the operation of the switching element 18b to supply current intermittently to the interpole gap 20 between the electrode 10 and the workpiece 14. The current I in the conventional electric discharge device is given by the equation $I=(E-V_g)/R$ (where E is the voltage of the DC supply; R is the resistance of the current-limiting resistor 18c; and $V_g$ is the interpole voltage). The interpole voltage reaches 20–30 V during discharge, O V when there is a short, E V without discharge, and O V when the switching element 18b is OFF. If the interpole voltage $V_g$ is detected and approximated by a smoothing circuit 22, the magnitude of the interpole gap may be controlled using the voltage. In other words, discharge does not generally occur when the interpole gap 20 is wide and thus the detected voltage $V_s$ is high. When the interpole gap 20 is narrow, the detected voltage $V_s$ is decreased, because short-circuiting or electric discharge readily occurs. Accordingly, if the difference between the detected voltage $V_s$ and the reference voltage $V_r$ obtained by comparison is amplified by an amplifier 24 and inputted to an oil servo coil 26, the electrode 10 may be controlled. The interpole gap 20 can be maintained roughly constant by means of an oil hydraulic servomechanism comprising an oil hydraulic pump 28 and an oil hydraulic cylinder 30.

In order to examine the quality of the processing condition in the conventional electric discharge machine, detected voltage $V_s$ obtained from the above interpole voltage $V_g$ is normally observed. When the detected voltage $V_s$ is low, the interpole impedance is also low and resulting in continuous arc discharge as well as short-circuiting. Consequently, dust incidental to processing and sludge are expected to accumulate in the interpole gap 20. In electric spark processing, the most dangerous irregular arc discharge is an electric discharge across carbon build up and the workpiece, the carbon is produced by the thermal decomposition of the working liquid. This condition establishes a state similar to what is created by a high interpole impedance. For this reason, the disadvantage is that it is impossible to detect, through the observation of the detected voltage $V_s$, a deteriiorated state of interpole gap caused by the irregular arc discharge.

SUMMARY OF THE INVENTION

An object of the present invention is to provide an electric discharge machine (hereinafter called an "EDM") capable of preventing the deterioration of conditions in an interpole gap caused by irregular arc discharge.

Another object of the present invention is to provide an EDM capable of preventing operational failures in connection with the processing in the EDM.

Still another object of the present invention is to provide an EDM capable of increasing processing speed.

A further object of the present invention is to provide an EDM capable of effectively removing sludge existing in the interpole gap.

In order to accomplish the above objects by processing a workpiece by installing an electrode across the workpiece through an insulating working liquid and causing electric discharge in an interpole gap, the electric discharge machine comprises a means for detecting impulse waves when an electric discharge is caused in the gap between the electrode and the workpiece, means for judging the conditions in the interpole gap according to the magnitude of the impulse wave detected by the above detection means to output a signal based on the judgment reached, and means for allowing the interpole gap to regain the normal condition by means of the output signal from the means for judging the conditions. This invention will be described in greater detail by referring to the drawings and the description of the preferred embodiment that follows.

DESCRIPTION OF THE PREFERRED EMBODIMENTS

Figure 1:
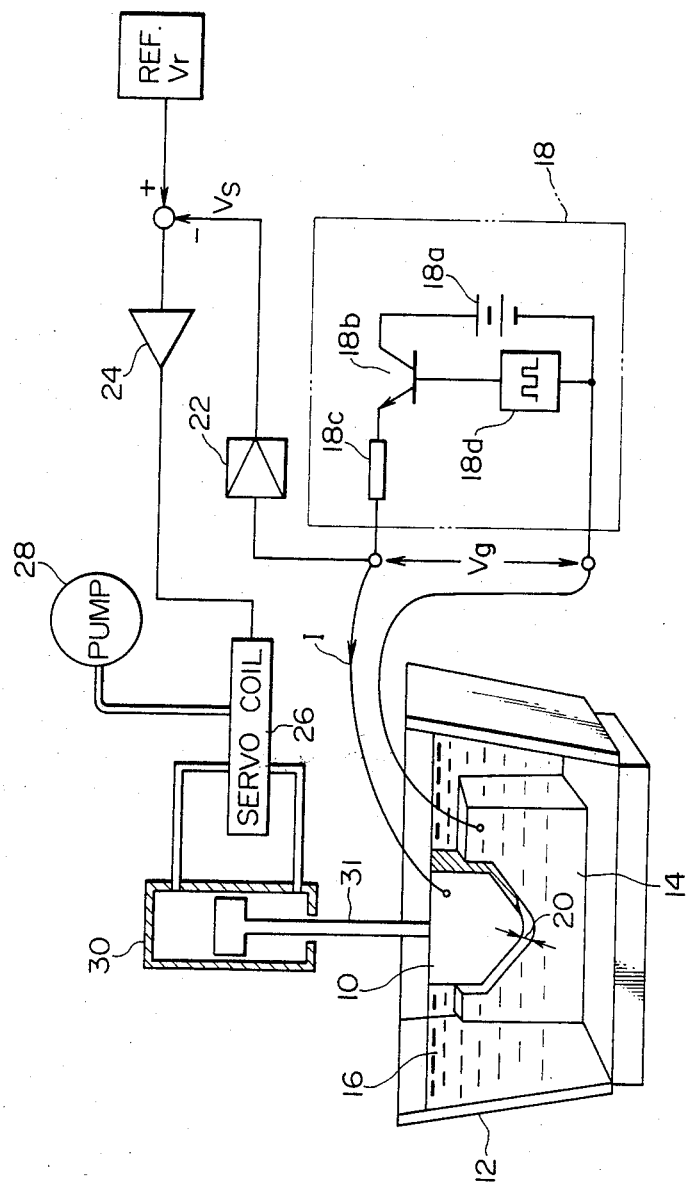
FIG. 1 is a diagram illustrating the principle on which a conventional electric discharge machine is based.
Figure 2:
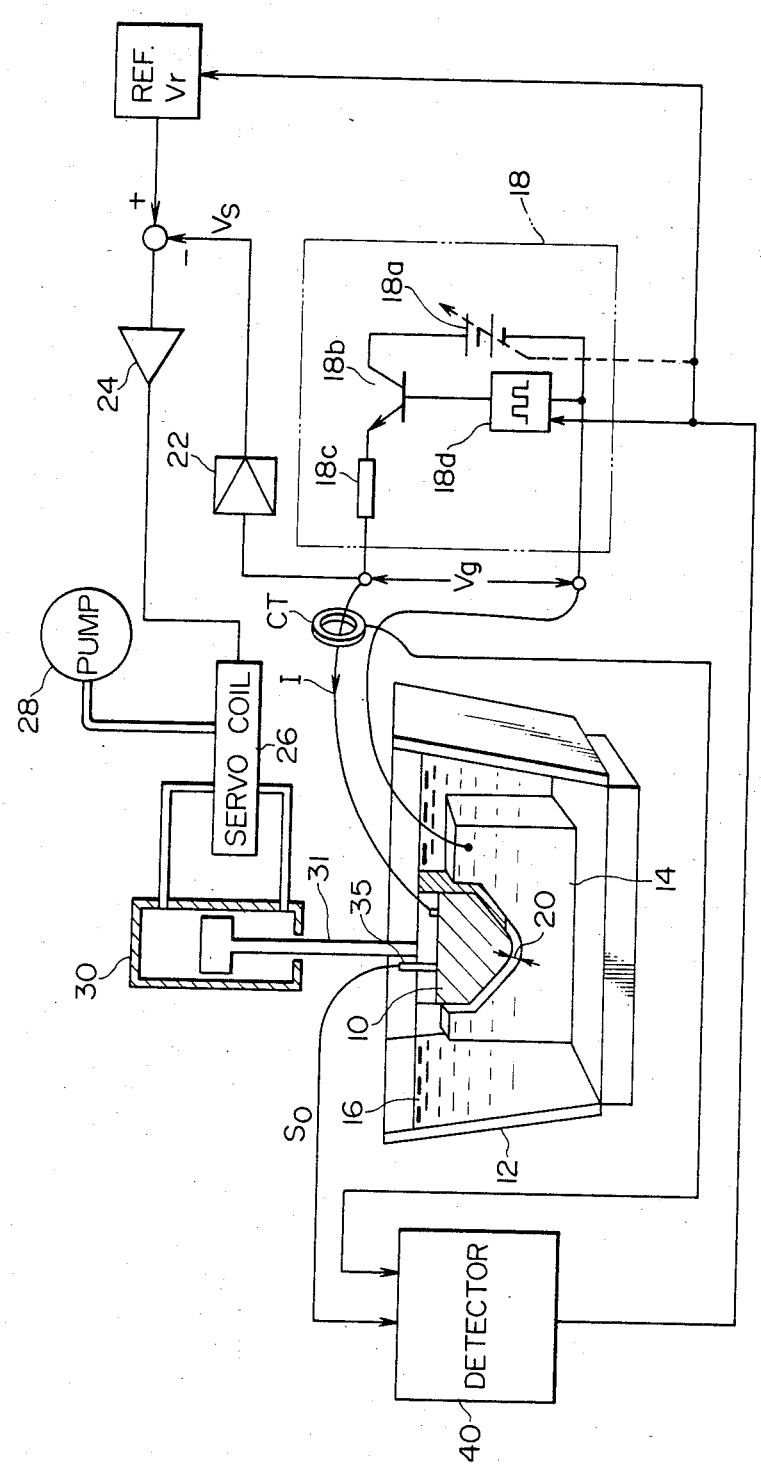
FIG. 2 is a diagram illustrating the principle on which an electric discharge machine according to the present invention is based.
Figure 3:
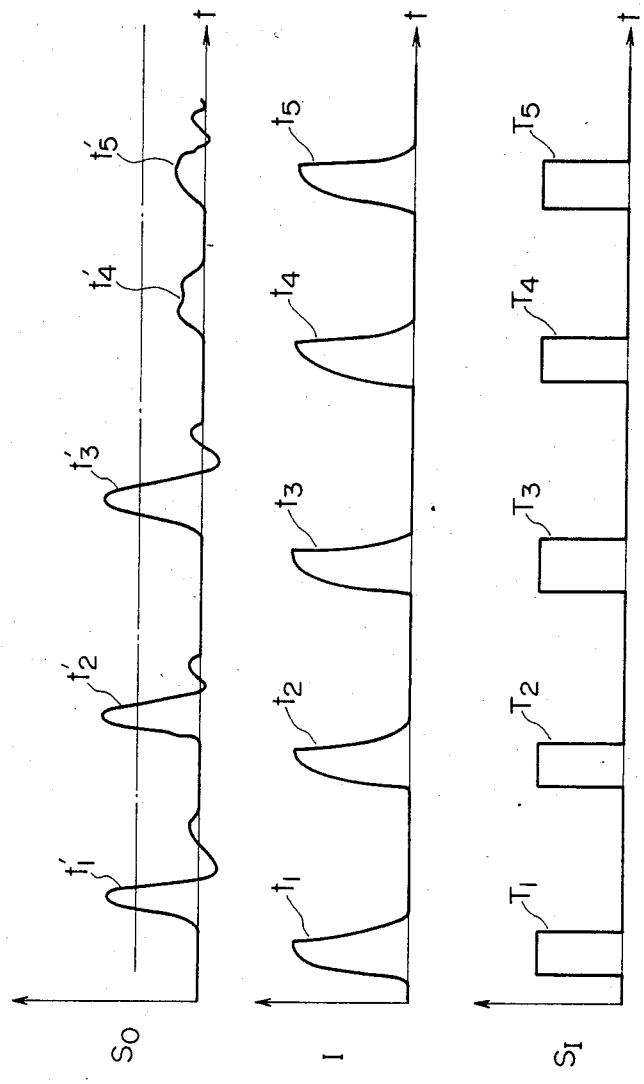
FIG. 3 is a time chart explanatory of the operation of a detector according to the present invention.

Referring now to the drawings, a first preferred embodiment of the present invention will be described. FIG. 2 is a schematic diagram illustrating the construction of an exemplary embodiment of the present invention, wherein like reference characters designate like parts shown in FIG. 1. FIG. 3 shows the relation between the waveforms of discharge current I and ultrasonic pressure waveforms detected by an ultrasonic sensor 35 buried in an electrode-supporting rod 31. As shown in FIG. 3, the discharge current I flows at time intervals $t_1 \sim t_5$, whereas the working liquid in the neighborhood of where the discharge has been initiated rapidly gasifies and explodes because of a high temperature of almost 6,000° C., thus generating foam.

Consequently, the working liquid in that region is subjected to a sharp change in pressure and this is propagated in the narrow interpole gap in the form of an ultrasonic impulse wave ($S_o$ in FIG. 3), which is then transmitted to the ultrasonic sensor 35 via the electrode and detected as an electric signal. When the discharge is normal, the impulse wave $S_o$ is periodically detected according to the size of the current; however, if the discharge is concentrated at a certain point, the ion concentration at that point is accelerated and increased. This establishes a state at this point almost free from insulation because of chips and the increase of carbon caused by the thermal decomposition of the working liquid. In this case, since the discharge is caused again before the foam disappears (normally, about 0.1–2 msec is required), because of the discharge at the discharge point, the volume alteration ratio is different from the liquid and relatively smaller than that in the case of the normal discharge. Accordingly, the force of the ultrasonic impulse generated is reduced. A detector 40 in FIG. 2 operates to detect normal and irregular discharges based on the above-mentioned principle. As shown in FIG. 3, the ultrasonic wave pressure $S_o$ is caused at $t_5$ because of the discharge current I. If the detected value, smaller than the value obtained at the time of normal discharge, is continuously obtained over a period of time, the detector will discriminate the discharge as an irregular one.

Figure 4:
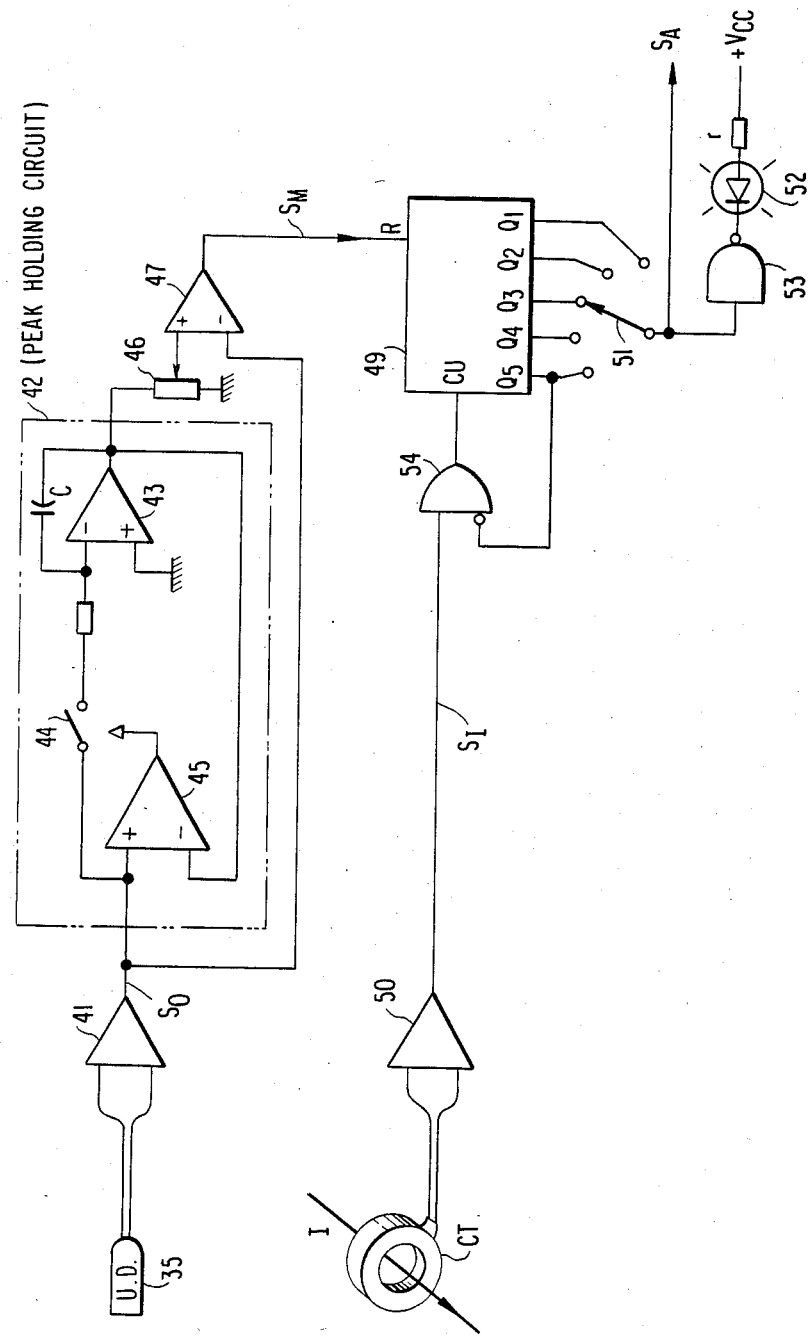
FIG. 4 is the detector and an irregular discharge discriminator.

FIG. 4 is a detailed view of the detector 40, wherein the output of the ultrasonic sensor 35 is amplified by an amplifier 41 and a signal $S_o$ is generated. There is also shown in FIG. 4 a peak holding circuit 42 which stores the highest $S_o$ signal value. That is, a capacitor C in an integrating circuit 43 is charged with a voltage higher than the highest output of the integrating circuit 43 through a resistor R, an analog switch 44, and a comparator 45. As a result, the output of a voltage dividing resistor 46 becomes equivalent to the divided voltage of the highest output in a normal condition and the normal condition is discriminated from an abnormal condition. The reason for this is that the pressure of explosion varies with the discharge energy and the period during which the energy is applied.

In electric spark processing in which the quantity of energy differs according to the type of processing ranging from rough processing to minute finishing, it is, therefore, difficult to uniformly standardize the normal impulsive force. Consequently, the peak hold circuit 42 must be used to compare the impulsive force with the most regular one.

A comparator 47 is employed to determine whether the impulse signal $S_o$ is correct and the result $S_m$ compared is applied to a counter 49 as a reset pulse. The discharge current I is detected by a current transformer CT and applied to the counter 49 as an upcount signal $S_I$ through an amplifier rectifier circuit 50. Consequently, +1 is counted in this circuit each time the current flows into the interpole gap since the counter will be then reset if the discharge is normal, the contents of the counter are not increased. If the discharge is abnormal and continues to establish the states $t_4$, $t_5$ shown in FIG. 3, the contents of the counter 49 will keep increasing because it is not reset. When the contents of the counter reach the quantity set up by a switch 51, the input of a driver 53 of a light emission diode 52 holds the "1" level and the diode 52 lights, whereas the output signal $S_A$ from the switch 51 also reaches the "1" level and is transmitted outwardly. An AND gate 54 is used to stop the counter when it is fully loaded.

As above described, it becomes possible to confirm whether or not the concentration of discharges occur through the value in the counter 49 and how many pulses have continuously been discharged at a time.

In the above exemplary embodiment, the circuit has been arranged with the continuous quantity of the concentration of discharges in the interpole gap as a parameter. It is not difficult to use the number of abnormal discharges per unit time as a discriminating parameter. For this reason, a clock pulse should preferably be applied to the count terminal CU of the counter 49 in FIG. 4, whereas the abnormal discharge pulse $S_M$, instead of the normal discharge pulse and the current detection signal $S_I$, should be inputted to the reset terminal R.

The arrangement shown in FIGS. 2 and 4 makes it possible to determine the magnitude of the concentration of discharges from the size of the impulse wave of the discharge. Thus, it is possible to detect the quality of the conditions in the interpole gap during electric spark processing.

Figure 5:
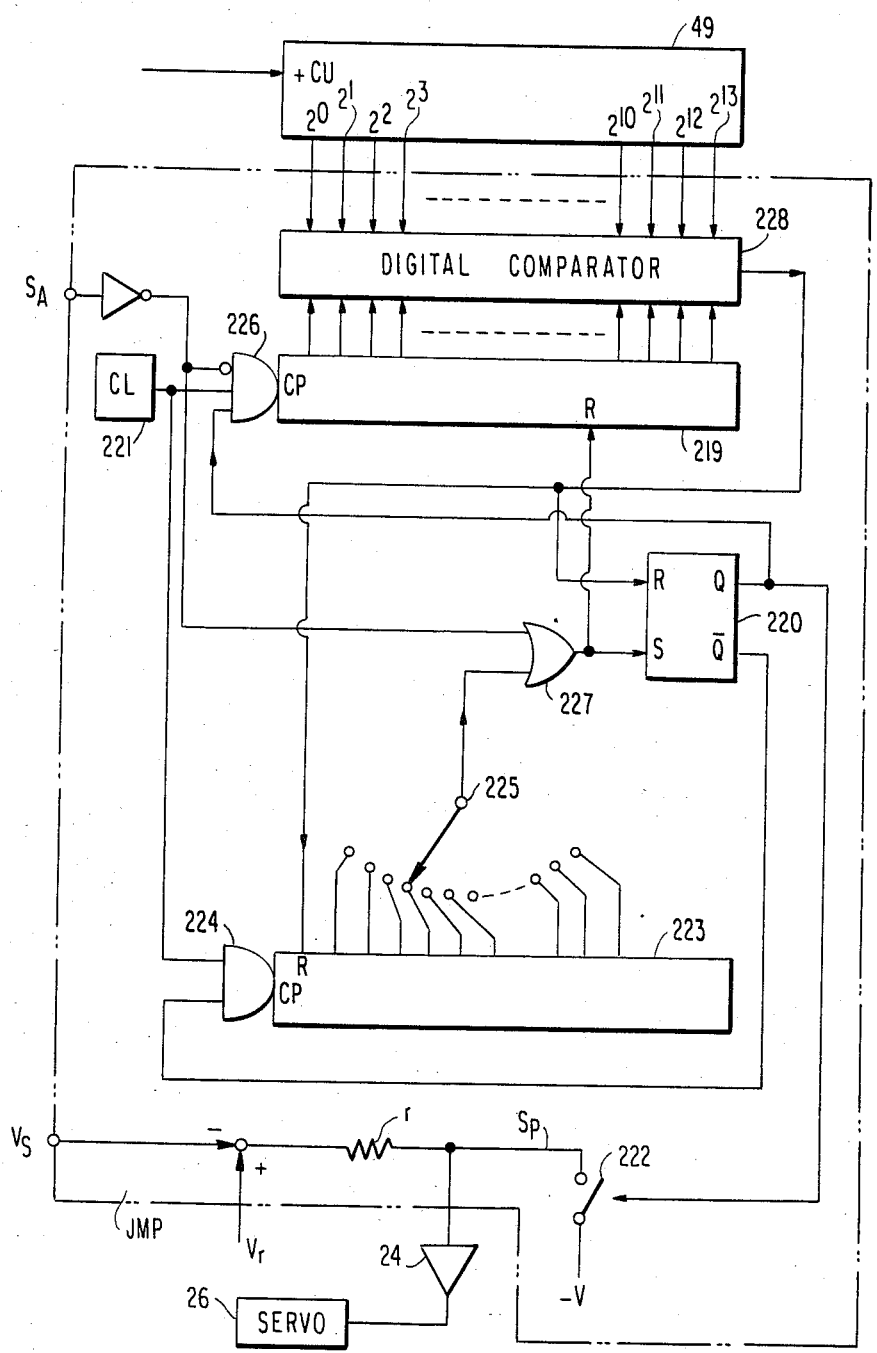
FIG. 5 is a block disgram illustrating a forced jump circuit in an interpole gap.

Referring now to FIG. 5, a means for normalizing the conditions of the interpole gap according to the signal given by the counter 49 used to determine the concentration of discharges will be described.

In FIG. 5, there is shown an arrangement for preventing the concentration of discharges and the occurrence of abnormal arc discharges by removing sludge, soil, and the like. This may deteriorate the condition of the interpole gap by forcibly enlarging the gap between the electrode and the workpiece when the premonitory symptom of abnormal arc discharge is judged existent according to the signal given by the counter 49 to cause the liquid to flow in the interpole gap by means of the pump action.

The output of the detector for detecting any abnormality present in the interpole gap together with a binary digital value as the output $2^0 \sim 2^n$ of the counter 49 is sent to a control device for controlling the interpole gap and these signals operate to force the interpole gap to enlarge. Thus, the magnitude of enlargement is automatically controlled depending on the condition of the interpole gap.

FIG. 5 is a detailed view of the interpole gap controlling device (JMP). This exemplary embodiment shows an example in which, by employing the above signal to control the period of time during which the signal for forcing the interpole gap to enlarge exists, arrangements are made to control the interpole gap enlarging ratio and the ratio of working time to enlarging time.

In FIG. 5, a multidigital coincidence circuit 228 (digital comparator) is used to determine whether the values in the counter 49 for detecting any abnormalities and a counter 219 for setting up time for forcibly enlarging the gap are equal. It resets a R-S flip flop 220 when the values coincide with each other. The time set up by the counter 219 conforms to the product of the period of the clock pulse given by a reference clock pulse generator 221 together with the value in the counter 49 for detecting abnormalities when the values in the counters 49 and 219 coincide with each other. The output of the R-S flip flop 220 operates an analog switch 222 for forcing interpole servo circuits 24, 26 to generate a signal $S_P$ for raising the electrode. Hence, while a signal $S_A$ generated when the output of the counter 49 reaches a predetermined value is applied, the output Q of the R-S flip flop 220 is maintained at a high level (1) and the electrode is forced to be raised. When the output Q is changed into a low level (0), the inversion output $\overline{Q}$ of Q becomes (1) and the clock pulse input gate 224 of a counter 223 for setting up working time is turned ON.

When switch 225 for presetting working time is set, the output Q of the R-S flip flop 220 becomes (0), so that the analog switch 222 for generating the signal $S_P$ for raising the electrode is kept in an ON state and the normal servo control of the interpole gap is exercised according to the difference between the interpole gap detected voltage $V_s$ and the reference voltage $V_R$. The resistor R is employed to protect the circuit for generating $V_s$ and $V_R$ when the signal $S_A$ for raising the electrode is generated.

The above operation is not always conducted except for when the signal $S_A$ for detecting the abnormal conditions of the interpole gap finds that the conditions of the interpole gap is abnormal. The signal $S_A$ is discriminated by an AND gate 226 and an OR gate 227. Since the output of the OR gate is 1 when $S_A$ is 0, the R-S flip flop 220 is being set. Consequently, the signal $S_P$ for raising the electrode is not applied and the normal servo control of the interpole gap is effectuated.

According to this preferred embodiment, the interpole gap is automatically set up depending on the magnitude of the concentration of discharges and that of abnormality when the signal $S_A$ for detecting the abnormal conditions of the interpole gap. The greater the difference, the greater the enlarging time and quantity become so that the conditions of the interpole gap may be made appropriate. In addition, when signal $S_A$ is 0, the electrode is not forced to be raised and the normal servo control of the interpole gap is effected.

In the above example, the case in which a period of time for raising the electrode is controlled has been described. However, the present invention is intended to control the gap between the electrode and the workpiece to improve the conditions of the interpole gap based on the signal for detecting abnormal conditions. Accordingly, the time for raising the electrode, working time, raising speed, raising and working frequencies, reference servo voltage, gains in the servo system and so forth according to the above signal and such control can be carried out.

Figure 6:
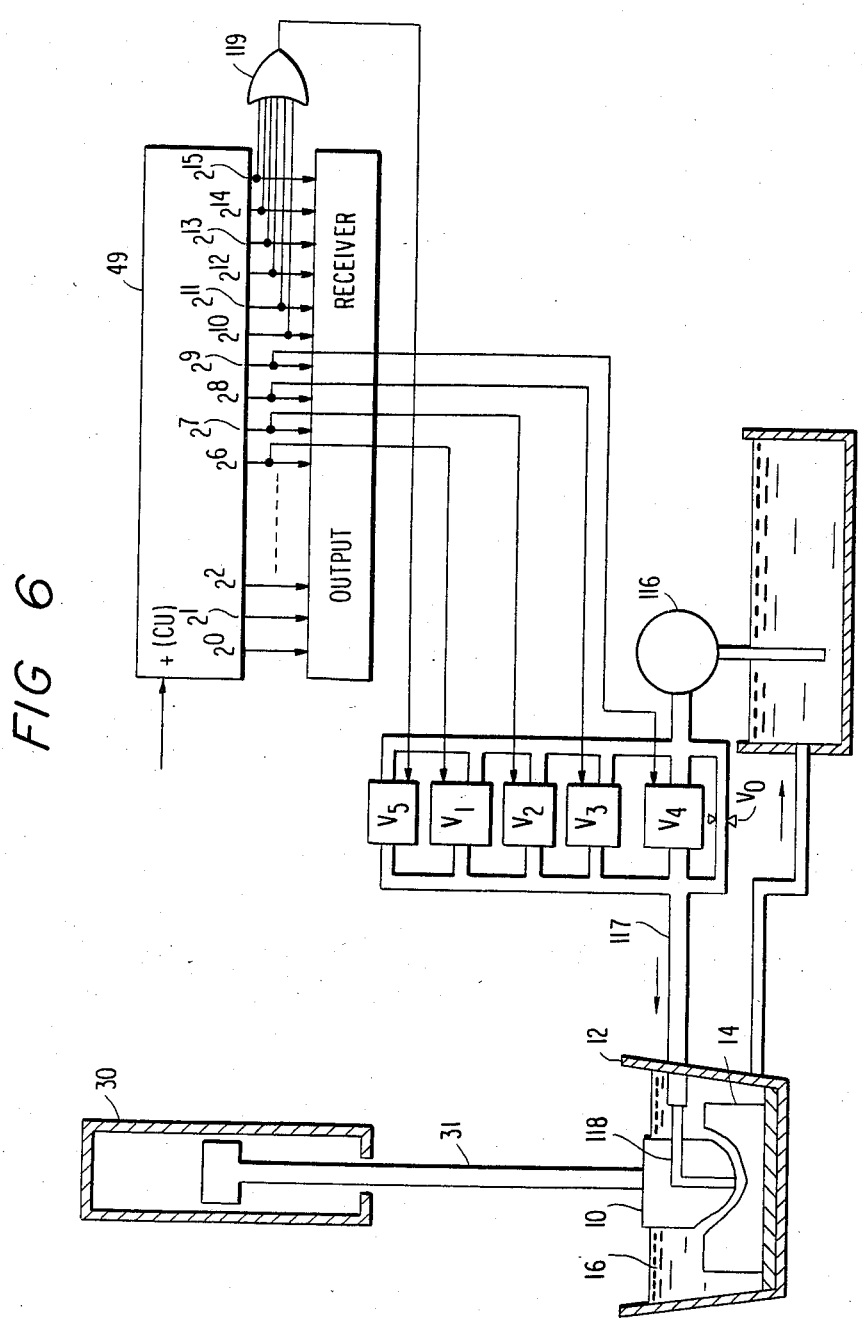
FIG. 6 is a diagram explanatory of a circuit for controlling the injection of working liquid.

Referring now to FIG. 6, an embodiment for restoring the normal conditions of the interpole gap is illustrated by jetting the optimum quantity of the working liquid to the interpole gap when the premonitory symptom of the generation of abnormal arcs is considered present. This is done to prevent the concentration of discharges and the occurrence of abnormal arc discharges by securing the proper quantity of the flowing liquid. If the contents of the counter 49 are greater, the conditions of the interpole gap will deteriorate with the presence of the concentration of discharges. Consequently, inconveniences will result, for instance, the detection of accumulated sludge in the interpole gap because of the retention of chips, carbon generated by the thermal decomposition of the working liquid because of abnormal arcs, and broken pieces of the electrode present in the interpole gap.

Accordingly, if the quantity of the working liquid transferred to the interpole gap is changed according to the contents of the counter, the normal conditions of the interpole gap will be restored. In FIG. 6, the output of a working liquid supply pump 116 is linked with a jet channel 118 through valves $V_1$, $V_2$, $V_3$, $V_4$ for controlling the liquid quantity after passing through a pipe 117, so that the quantity of the flowing liquid may change in proportion to the opening of the valves $V_1$, $V_2$, $V_3$, $V_4$. Moreover, the opening and closing of the valves $V_1$, $V_2$, $V_3$, $V_4$ are controlled by the outputs $2^6 \sim 2^9$ of the counter 49. In this example, valves $V_1$, $V_2$, $V_3$, $V_4$ are respectively controlled to supply 100 cc/min, 200 cc/min, 400 cc/min, and 800 cc/min of the liquid so as to accelerate the quantity of the liquid corresponding to the concentration of discharges to the interpole gap. For instance, when the contents of the counter 49 are greater than 64, $V_1$ is opened because the output of $2^6$ is kept at 1 and 100 cc/min of the flowing liquid is supplied to the interpole gap. When the contents are greater than 128, $V_1$ and $V_2$ are opened because the output of $2^7$ is kept at 1 and 300 cc/min of the flowing liquid is supplied thereto. When the difference is extremely great, that is, more than 1,024, a forced jet valve $V_5$ is opened through the OR gate 119 and several thousands cc/min of the flowing liquid is supplied thereto. On the contrary, when the contents of the counter are less, a properly small quantity of the liquid employed usually for processing purposes is given to the interpole gap through a manually operated valve $V_o$.

As above described in the exemplary embodiments of the present invention, because the quantity of the flowing liquid is controlled by judging the magnitude of the concentration of discharges from the size of the impulse wave of the discharge and according to the magnitude of the concentration, the sludge generated in the interpole gap can be efficiently discharged. This results in highly improved discharge efficiency. In other words, because the discharge will be produced from the electrode through the sludge to the workpiece if the sludge is present in the interpole gap, the considerable quantity of discharge energy is consumed by the sludge and processing efficiency is thus reduced. If such a phenomenon is prevented, discharging will be facilitated without increasing the interpole impedance more than necessary because the flow of the liquid can be reduced when the interpole gap is narrow and consequently stabilized processing may have the effect of increasing the processing speed.

Although the quantity of the flowing liquid is changed in the above examples, it is also possible to control liquid pressure according to the contents of the counter in line with the objects of the present invention to effectively reduce the quantity of sludge in this interpole gap. In the case, the same effect is achievable.

Figure 7:
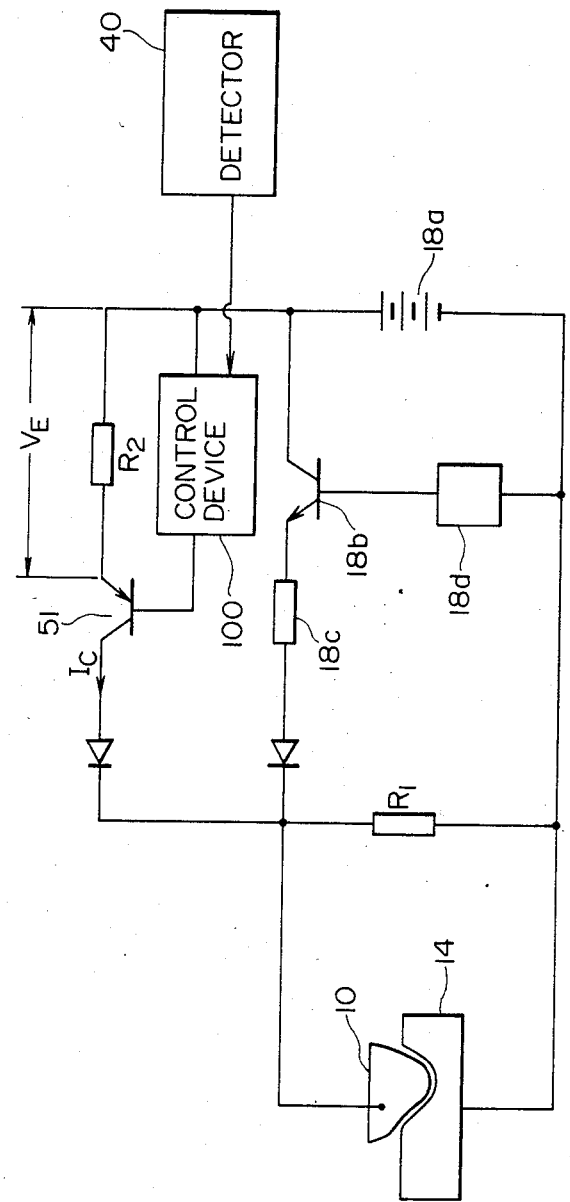
FIG. 7 is a circuit diagram illustrating a circuit for controlling voltage applied to the interpole gap.
Figure 8:
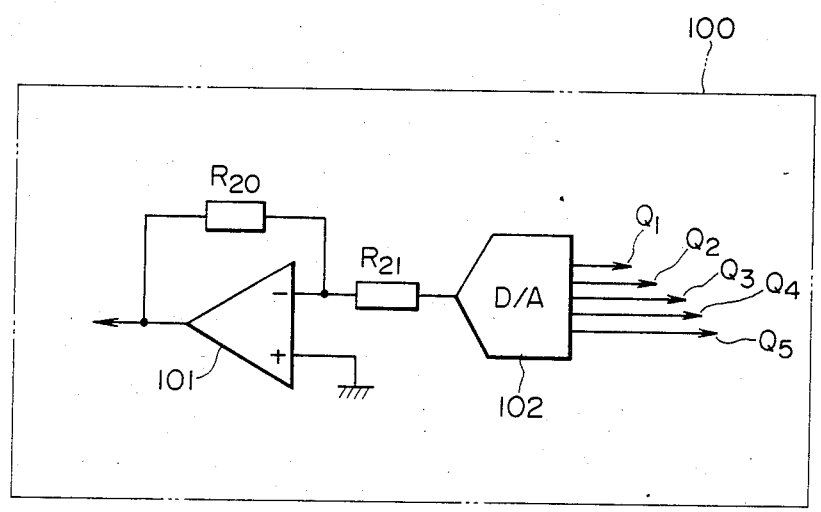
FIG. 8 is a block diagram illustrating the controller in FIG. 7.

FIGS. 7 and 8 illustrate a means for restoring the interpole gap to the normal condition by reducing the voltage applied by the supply when the premonitory symptom of the generation of abnormal arcs is considered present. This structure is also employed for preventing the discharge from being caused to prevent the concentration of discharges and the generation of abnormal arcs.

The example shown in FIG. 7 is one in which the voltage applied to the interpole gap is changed according to the output signal of the counter 49 and if voltage where discharge is initiated is reduced, the discharge will be caused with difficulty so that the concentration of discharges can be prevented in the gap across the same electrodes. Moreover, when the concentration of discharges is not present, discharge within the same discharge gap will be facilitated by raising the voltage applied to the interpole gap.

In FIG. 7, there is shown a control device 100 for applying to the base of the transistor 51 the analog voltage corresponding to the output of the detector circuit 40 by amplifying the voltage. The control device comprises, as shown in FIG. 8 in detail, a D/A converter 102 and an inversion amplifier 101. The analog voltage can be obtained by connecting the D/A converter 102 to the outputs $Q_1$, $Q_2$, $Q_3$, $Q_4$, $Q_5$ of the counter 49. The voltage $V_g$ applied to the interpole gap is given by the following:

$$V_g = -I_c R_1 \tag{1}$$

$I_c$ is nearly equivalent (99%) to the current flowing in the emitter follower load $R_2$ of the transistor 51, whereby the $I_c$ is represented by $$I_c = V_E/R_2 = V_B/R_2 \tag{2}$$

Therefore, $V_g$ is obtained from equations (1) and (2) as follows:

$$V_g = -R_1/R_2 \cdot V_3 \tag{3}$$

In this case, $V_B$ represents the base voltage of the transistor 51.

If $R_1 = 30$ K$\Omega$, $R_2 = 1$ K$\Omega$, $E = 300$ V, $V_B$ will change within the range of $0 \sim 300$ V as the output of the control changes within the range of $0 \sim 10$ V.

When the contents of the counter 49 increase after the occurrence of the concentration of discharges, the output of the inversion amplifier 101 decreases, thus reducing the voltage $V_g$ applied to the interpole gap and eliminating the concentration of discharges.

Although the voltage applied to the interpole gap is continuously changed according to the contents of the detector circuit 40 for detecting the concentration of discharges in the above examples, it is not always necessary to make the contents of the counter proportional to the voltage. The transfer of the arc discharge may be prevented more effectively by changing the voltage according to a serial ratio.

According to the exemplary embodiments as mentioned above, the concentration of discharges is detected by the size of the impulse wave of the discharge. Moreover, the voltage applied across the interpole gap is controlled to attempt the dispersion of discharges. Hence, an entirely new electric discharge machine with the above features is defined.

Figure 9:
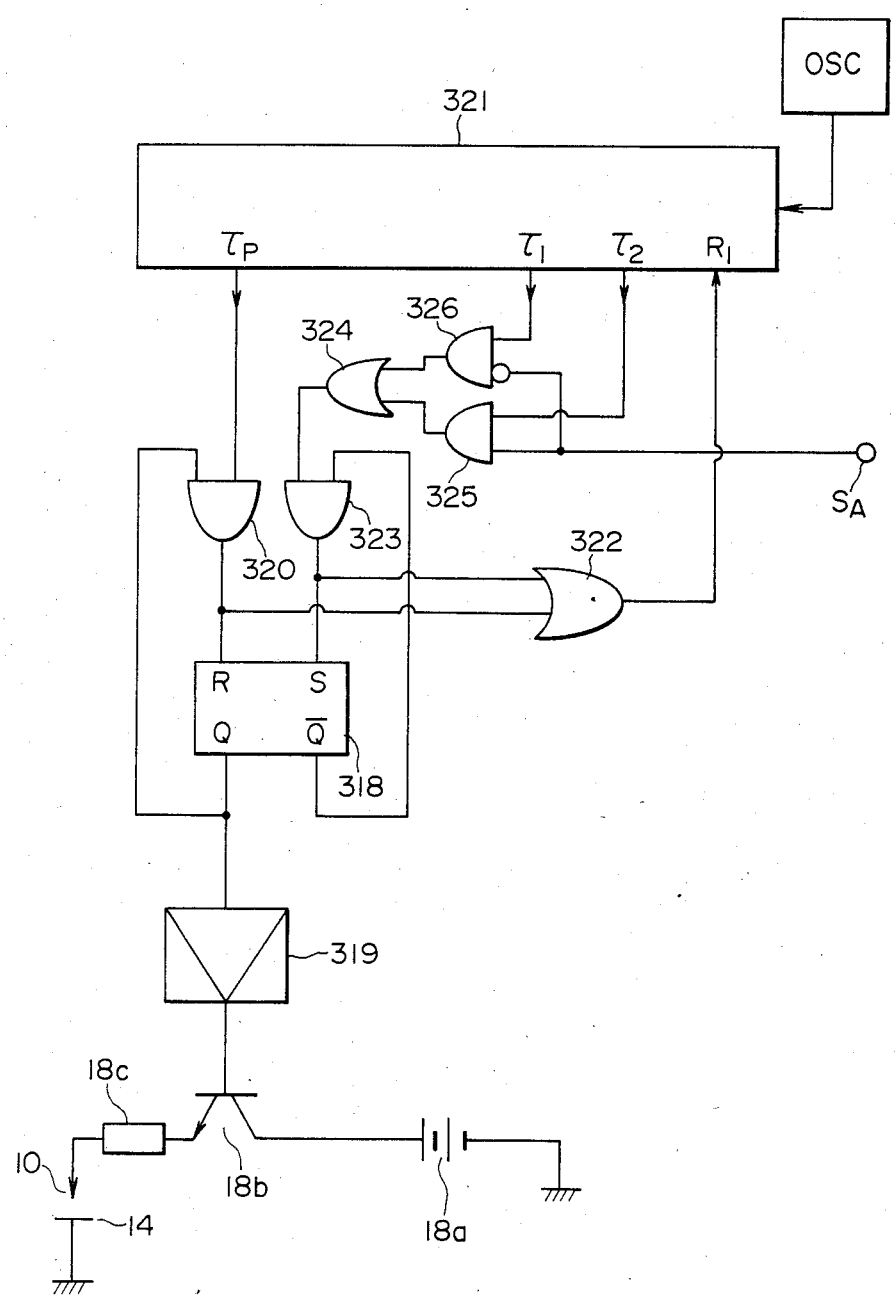
FIG. 9 is a circuit diagram illustrating an OFF time control circuit.

Referring now to FIG. 9, there is illustrated another embodiment of the present invention as a means for restoring the interpole gap to the normal condition by securing the de-ionizing time for the interpole gap by extending the OFF time of the switching element. This occurs when the premonitory symptom of the generation of abnormal arcs is judged to be present in order to prevent the concentration of discharges and the generation of abnormal arc discharge.

By extending the OFF time of the switching element 18b according to the output obtained by the detection circuit, the period between discharges can be extended and the de-ionization effect thus obtained may be utilized to cancel one of the factors causing the concentration of discharges. Referring to FIG. 9, the description of a circuit and the method of cancelling the concentration will be given as follows. When the output of RS flip flop 318 is 1, the switching element 18b is turned ON through an amplifier 319. That is, it is turned ON by the switching element, and the OFF time is when Q=0. When Q=1, the output of an AND gate 320 is "0" until the ON time setting output $\tau_p$ of an ON time, OFF time setting counter 321 becomes "1" but the element becomes OFF because Q becomes "0" as it resets the flip flop 318 when $\tau_p$ changes to "1".

Since the output of the AND gate 320 simultaneously resets the time setting counter 321 through an OR gate 322, counting is initiated. As Q=1 when Q=0, $\overline{Q}=1$ is not established until one of the gates of an AND gate, or the output of an OR gate 324 becomes "1". An OR gate 324 and AND gates 325, 326 are used to control the operation of setting OFF time for two systems and to set $\tau_1$ when the signal $S_A$ is "0" and $\tau_2$ when it is "1". According to this exemplary embodiment, processing is carried out with OFF time, $\tau_1$ during the normal discharge and $\tau_2$ during the abnormal discharge. When the abnormal discharge is considered present, the concentration of discharges is prevented by sharply extending the quiescent time to provide the de-ionization effect and to suppress the generation of abnormal arcs. Moreover, this entirely new electric discharge machine provided according to the present invention features the detection of the concentration of discharges in its early stages by detecting the impulse wave of the discharge.

Although the OFF time is divided into two intervals, $\tau_1$ and $\tau_2$, the same effect may be achieved by continuously setting up the OFF time depending on the contents of the counter 49 for detecting the number of concentrated discharges.

Figure 10:
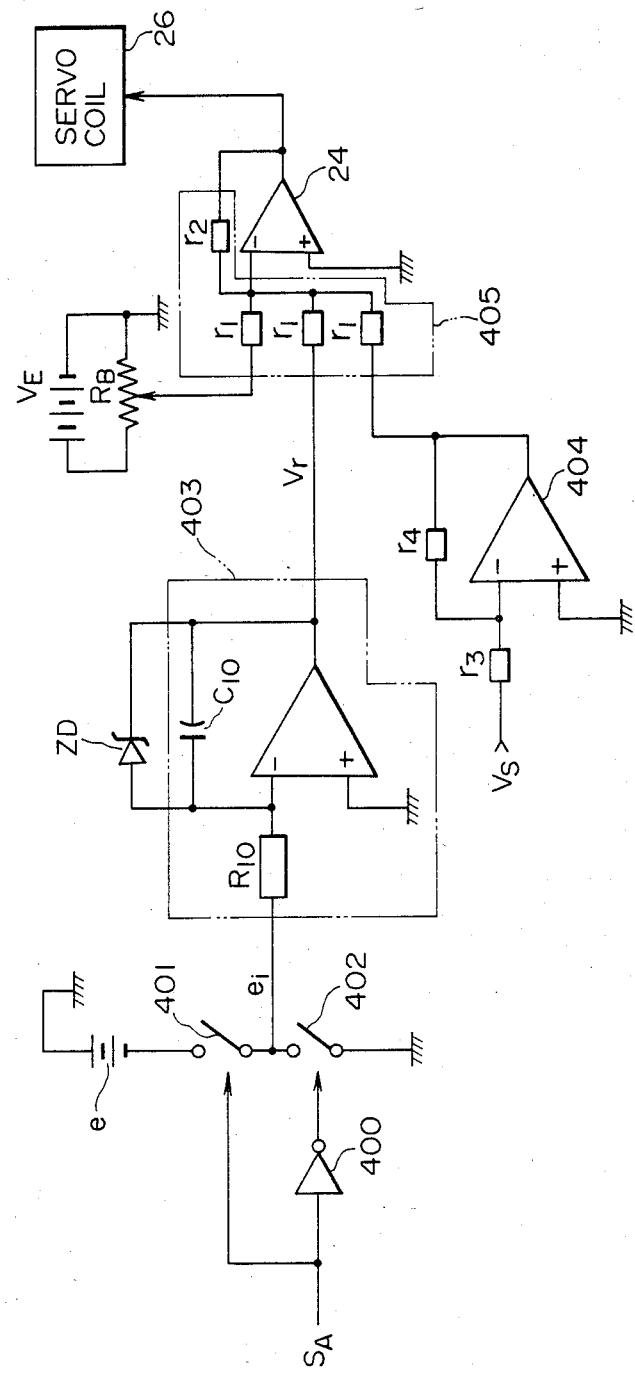
FIG. 10 is a circuit diagram illustrating a circuit for controlling a servo reference value in the interpole gap.

Referring to FIG. 10, there is illustrated another embodiment of the present invention for restoring the interpole gap to the normal condition by enlarging the length of the gap by changing the reference voltage for the servo control of the interpole gap when the premonitory symptom of the generation of abnormal arcs is detected. This prevents the concentration of discharges and the generation of abnormal arc discharge.

By changing the control of the interpole gap or the reference value Vr of the interpole servo signal based on the output obtained from the detection circuit, the reference voltage is increased in the presence of an abnormality to control the interpole gap in such a manner to increase the mean interpole voltage. Hence, the concentration of discharges can be prevented as the enlarged gap makes the initiation of discharge difficult. Referring to FIG. 10, an exemplary embodiment of the invention to achieve the above prevention concentrated discharges will be described in detail.

Since the output of an inverter 400 is "0" when the detection signal $S_A$ is "1", that is, when abnormality is present, anolog switches 401, 402 are ON and OFF, respectively. As a result, the input voltage for an integrating circuit 403 (comprising an operating amplifier, a resistor $R_{10}$, and a capacitor $C_{10}$) becomes $e_i = -e$, whereas the voltage $V_r$ is represented by $$V_r = V + e/R_{10} \cdot C_{10} \times 5 \tag{1}$$

However, V is the initial value when t=0.

Accordingly, the reference voltage $V_r$ keeps increasing as long as $S_A$ is "1" and $V_s$ also increases negatively and correspondingly, so that the interpole gap is further enlarged. The reference voltage $V_r$ and the detected voltage $V_s$ are compared in a comparator 405 and a difference signal is applied to the amplifier 24.

When $S_A$ is "0", that is, when no concentration of discharges is present, ei becomes "0" and the voltage of the integrating capacitor $C_{10}$ is discharged. Consequently, $V_r$ is decreased and the interpole gap is so controlled that it is gradually made narrow; the discharge frequency and working speed are thus increased. The $R_{10}$, $C_{10}$ which determine the integrating time constant are the values in the order of several seconds in this case. It is, therefore, undesirable to change $V_R$ for a short time because control in such a way causes inconveniences such as the hunting phenomenon and the vibration of the electrode as the magnitude of the interpole gap is sharply changed. In addition, the value of $V_r$ is controlled by a Zener diode $Z_0$ and limited to the Zener voltage in the positive direction and to 0 in the negative direction. The power supply $V_E$ and the volume $R_B$ are for use in manually setting the value and the interpole gap may be automatically controlled with the set value as a central figure. An operating amplifier 404, resistor $r_3$, $r_4$ play the roles of an inversion circuit and an attenuator for controlling the detected voltage $V_s$ of the interpole gap by adding the voltage value to $V_r$.

Although the detected signal $S_A$ is integrated to make $V_r$ change in the above example, it is also possible to exercise further detailed control by converting the contents of the counter 49 through D/A conversion and employing a circuit with time lag of first order and a large time constant, the output of the circuit against the input of, for instance, an RC or LR circuit and so on increasing exponentially and functionally.

As above described in reference to the exemplary embodiments of the present invention, this unique electric discharge machine is capable of judging abnormal discharging conditions to be present from a parameter in the presence and absence of the concentration of discharges depending on the size of the impulse wave of the discharge generated, changing the reference value for the servo control of the interpole gap to normalize the discharging condition, and restoring the normal condition of the interpole gap by enlarging the interpole gap and reducing the discharge frequency when the abnormal condition is present.

I claim:

1. An electric discharge machine comprising an electrode disposed across a workpiece through an insulation working liquid;
    a working power supply connected across said workpiece end said electrode for intermittently supplying a working current to an interpole gap across said electrode and said workpiece;
    an interpole voltage detector for detecting the interpole voltage across said electrode and said workpiece;
    a reference voltage setting device for setting the voltage corresponding to the predetermined interpole gap;
    a comparator amplifier for comparing the voltage detected by said interpole voltage detector and the reference voltage given by said reference voltage setting device and amplifying the difference between the signals;
    an electrode-driving device for raising and lowering said electrode according to the signal from said comparator amplifier;
    a device for supplying the insulating working liquid to said interpole gap;
    a detector for detecting the working current supplied to said interpole gap;
    means for detecting the impulse wave generated when discharge is caused in said interpole gap;
    means for determining the conditions of said interpole gap from the size of the impulse wave detected by said means for detecting the impulse wave and the detected current signal provided by said detector for detecting the working current and outputting a signal based on the determination; and
    means for restoring said interpole gap to the normal limits according to the signal given by said means for determining the conditions of said interpole gap.

2. The device as claimed in claime 1, wherein said electrode is fixed to an electrode-supporting rod and said electrode-supporting rod is driven by said electrode driving device.

3. The device as claimed in claim 2, wherein said electrode driving device includes an oil hydraulic servomechanism.

4. The device as claimed in claim 3, wherein said means for detecting the impulse wave includes an ultrasonic sensor.

5. The device as claimed in claim 4, wherein said ultrasonic sensor is embedded in said electrode supporting rod.

6. An electric discharge machine comprising an electrode fixed to an electrode-supporting rod disposed across a workpiece through an insulating working liquid;
    a working power supply connected across said workpiece end said electrode for intermittently supplying a working current to an interpole gap across said electrode and said workpiece;
    an interpole voltage detector for detecting the interpole voltage across said electrode and said workpiece;
    a reference voltage setting device for setting the voltage corresponding to the predetermined interpole gap;
    a comparator amplifier for comparing the voltage detected by said interpole voltage detector and the reference voltage given by said reference voltage setting device and amplifying the difference between the signals;
    an electrode driving device for driving said electrode-supporting rod to raise and lower said electrode according to the signal from said comparator amplifier, said electrode driving device including an oil hydraulic servomechanism;
    a device for supplying the insulating working liquid to said interpole gap;
    a detector for detecting the working current supplied to said interpole gap;
    means including an ultrasonic sensor for detecting the impulse wave generated when discharge is caused in said interpole gap;
    means for determining the conditions of said interpole gap from the size of the impulse wave detected by said means for detecting the impulse wave and the detected current signal provided by said detector for detecting the working current and outputting a signal based on the determination; and
    means for restoring said interpole gap to the normal limits according to the signal given by said means for determining the conditions of said interpole gap;

wherein said means for determining the conditions of said interpole gap comprises a peak hold circuit for storing the highest value of the signal given by said ultrasonic sensor; a comparator for comparing the signal provided by said peak hold circuit with the signal provided by said ultrasonic sensor and outputting a signal of comparison; a counter for counting according to the detected current signal provided by said current detector, said counter being reset by the signal provided by said comparator; and a signal output device for applying a signal when the value counted by said counter has reached a predetermined value.

7. The device as claimed in claim 6, wherein said peak hold circuit comprises a series circuit comprising an analog switch connected across the input and output sides and an integrating circuit; and a comparator to which the signal from said ultrasonic sensor and the output signal of said integrating circuit are applied, said comparator generating a signal for controlling the switching of said analog switch.

8. The device as claimed in claim 7, wherein the setting of the value counted by means of said signal output device is made by a switch.

9. The device as claimed in claim 8, wherein a light emission element is lit by the signal given by said signal output device.

10. The device as claimed in claim 6, wherein said means for restoring said interpole gap to the normal condition comprises means for controlling said interpole gap.

11. The device as claimed in claim 10, wherein said means for controlling said interpole gap is used to forcibly enlarge said interpole gap and to control said interpole gap to automatically provide the magnitude of enlargement.

12. The device as claimed in claim 11, wherein said means for controlling said interpole gap receives the output from said counter of said means for determining the conditions of said interpole gap and the output from said signal output device and applies a signal for raising said electrode to said comparator amplifier applying the signal to said electrode driving device.

13. The device as claimed in claim 12, wherein said means for controlling said interpole gap comprises an AND gate receiving a signal generated when the value counted by the counter of said means for determining the conditions of said interpole gap reaches a predetermined value, a signal from a reference clock pulse generator and output Q of a R-S flip flop; a counter for setting time for sharply enlarging said interpole gap, said counter keeping count on receiving the output signal from said AND gate, a multidigital coincidence circuit for giving a signal when the value counted by the counter of said means for determining the conditions of said interpole gap conforms to the value set by said time setting counter; said R-S flip flop reset by the output signal from said multidigital coincidence circuit and used to generate output Q; and a switch operated by the output Q of said R-S flip flop and used to apply a signal for raising said electrode to said comparator amplifier.

14. The device as claimed in claim 6, wherein said means for restoring said interpole gap to the normal condition is used for controlling said working liquid supply device.

15. The device as claimed in claim 14, wherein said means for controlling said working liquid supply device is connected across a working liquid supply pump and a working liquid feeding pipe.

16. The device as claimed in claim 15, further comprising control means composed of a plurality of valves opened and shut according to the output from the counter of said means for determining the conditions of said interpole gap.

17. The device as claimed in claim 16, wherein the plurality of valves are each opened and closed according to a different counted value.

18. The device as claimed in claim 17, wherein one of the plurality of valves is a forced jet valve supplying a large quantity of working liquid when the counter value of the counter exceeds the predetermined value.

19. The device as claimed in claim 18, wherein the working liquid fed by the working liquid feeding pipe is emitted from a jet channel provided in said electrode to said interpole gap.

20. The device as claimed in claim 6, wherein said working power supply comprises a DC supply, a switching element, and a resistor connected in series to said interpole gap, and a switching control device for controlling the switching of said switching element.

21. The device as claimed in claim 20, wherein said switching element is a transistor.

22. The device as claimed in claim 21, wherein said switching control device is an oscillator.

23. The device as claimed in claim 22, wherein said means for restoring said interpole gap to the normal condition is employed for changing and controlling the value of pulse voltage applied.

24. The device as claimed in claim 23, wherein said changing and controlling the value of pulse voltage applied is used to increase and decrease the value of pulse voltage applied to said interpole gap according to the value counted by the counter of said means for judging the conditions of said interpole gap.

25. The device as claimed in claim 24, wherein said means for changing and controlling the value of pulse voltage applied comprises a D/A converter for converting the value counted by the counter of said means for determining the conditions of said interpole gap into an analog signal; an amplifier for inversely amplifying the output of said D/A converter; a serial body comprising DC supply and a first resistor connected to said interpole gap and a transistor controlled by said amplifier; and a second resistor connected in parallel to said interpole gap.

26. The device as claimed in claim 25, wherein the first resistor as a component of the serial body is used as an emitter follower load.

27. The device as claimed in claim 25, wherein said D/A converter is used to proportionally generate the value counted by the counter.

28. The device as claimed in claim 25, wherein said D/A converter is used to exponentially generate the value counted by the counter.

29. The device as claimed in claim 20, wherein said means for restoring said interpole gap to the normal condition is employed for controlling said switching control device.

30. The device as claimed in claim 29, wherein said control of said switching control device is used to change and control the quiescent time of the pulse voltage supplied to said interpole gap.

31. The device as claimed in claim 30, wherein said control of said switching control device is used to change and control the quiescent time of the pulse voltage according to the value counted by the counter of said means for determining the conditions of said interpole gap.

32. The device as claimed in claim 30, wherein said control of said switching control device is used to change the quiescent time to what is different from the set quiescent time for the normal condition when the value counted by the counter of said means for determining the conditions of said interpole gap reaches the predetermined value.

33. The device as claimed in claim 32, wherein the alteration and control of the quiescent time is an extended quiescent time.

34. The device as claimed in claim 32, wherein said control of said switching control device is accomplished by an oscillator; an ON time OFF time setting counter for setting time for applying the pulse voltage, the first quiescent time of the pulse voltage in the normal condition, and the second quiescent time of the pulse voltage in the abnormal condition, and counting the signal from said oscillator; means for switching the set value from said first to second quiescent time when the value counted by the counter of said means for determining the conditions of said interpole gap reaches the predetermined value; and means for resetting the counter involved when said setting counter counts the time of the application or the quiescent time of the pulse voltage.

35. The device as claimed in claim 6, wherein said means for restoring said interpole gap to the normal condition is for changing and controlling the set value for said reference voltage setting device.

36. The device as claimed in claim 35, wherein said changing and controlling the set value for said reference voltage setting device is employed to increase and decrease the set value according to the value counted by the counter of said means for judging the conditions of said interpole gap.

37. The device as claimed in claim 35, wherein said changing and controlling the set value for said reference voltage setting device is employed to change and control the set value when the value counted by the counter of said means for judging the conditions of said interpole gap reaches the predetermined value.

38. The device as claimed in claim 37, wherein the set value increases and decreases according to the time during which the value counted by the counter continuously maintains the predetermined value.

39. The device as claimed in claim 38, wherein said changing and controlling the set value for said reference voltage setting device comprises a switch used to supply power according to the signal generated when the value counted by the counter of said means for determining the conditions of siad interpole gap reaches the predetermined value; and an integrating circuit connected to said supply through said switch.

40. The device as claimed in claim 39, wherein a Zener diode is connected in parallel to said integrating circuit.

41. The device as claimed in claim 40, wherein a manually-operated setting device is provided for manually setting the predetermined value of said reference voltage setting device.

* * * * *